INVENTORS.
ARMAND L. A. POSENER,
AUSTIN E. ELMORE,
BY
ATTORNEYS.

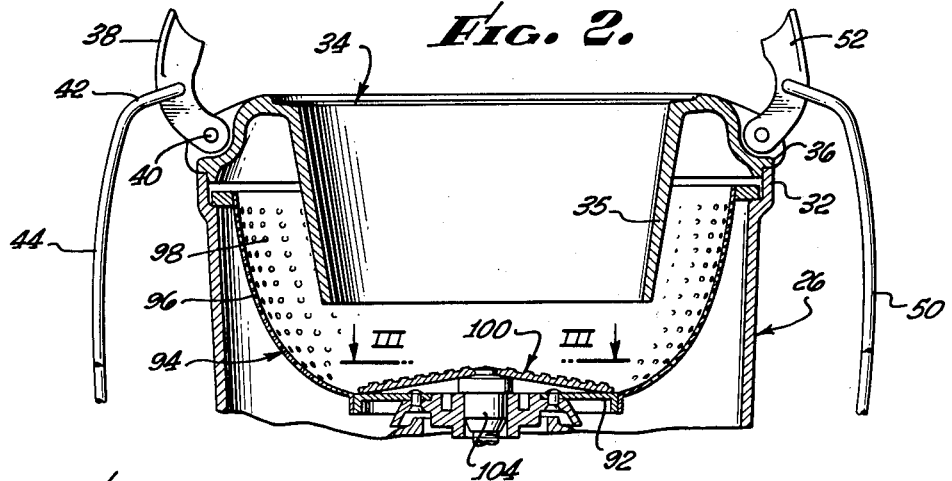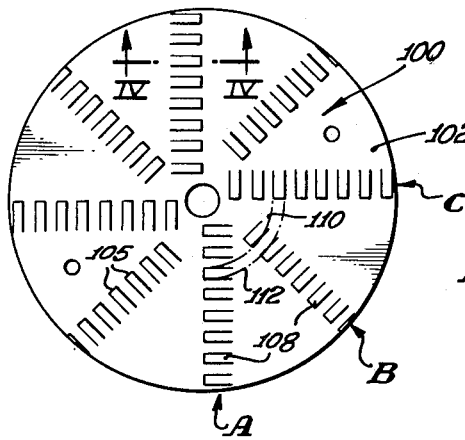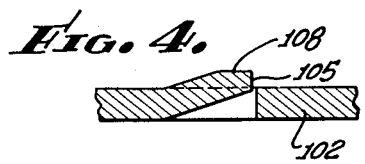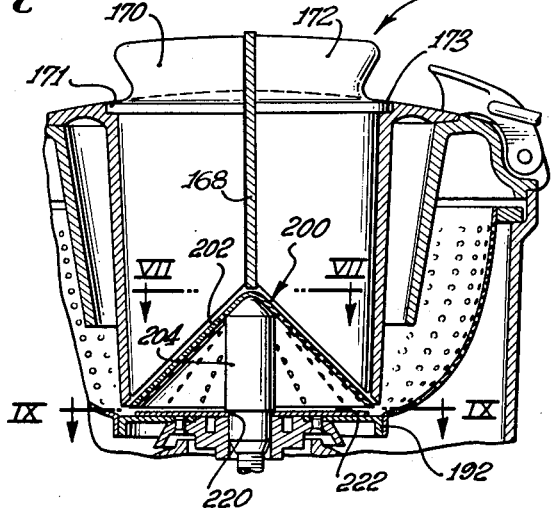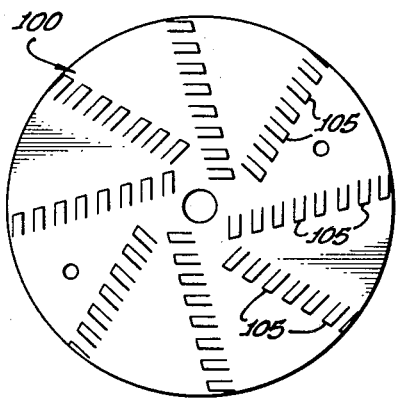
ARMAND L. A. POSENER,
AUSTIN E. ELMORE,
INVENTOR.

Aug. 20, 1963   A. L. A. POSENER ETAL   3,101,107
FRUIT AND VEGETABLE JUICE EXTRACTOR
Original Filed Nov. 25, 1957   3 Sheets-Sheet 3

ARMAND L. A. POSENER,
AUSTIN E. ELMORE,
INVENTORS

BY

ATTORNEYS.

United States Patent Office 3,101,107
Patented Aug. 20, 1963

3,101,107
FRUIT AND VEGETABLE JUICE EXTRACTOR
Armand L. A. Posener, La Habra, and Austin E. Elmore, South Pasadena, Calif., assignors to Kitchen Master Appliance, Inc., Los Angeles, Calif., a corporation of California
Continuation of application Ser. No. 698,455, Nov. 25, 1957. This application Mar. 26, 1962, Ser. No. 183,995
4 Claims. (Cl. 146—76)

The present invention is directed to improvements in power operated juice extractors and more particularly relates to such devices designed for domestic use and functioning by shredding of fruits or vegetables or the like and then, by centrifugal force, separating the liquid juices from the pulp of the food material, the juice being dispensed from the device through one opening and the virtually dry pulp being dispensed through another opening for disposal.

This application is a continuation of our earlier filed application entitled, Fruit and Vegetable Juice Extractor, filed November 25, 1957 and bearing Serial No. 698,455, now abandoned and assigned to the same assignee as the present application.

In a preferred form of the present invention hereinafter described and illustrated in detail, there is provided a base serving as a housing for an electric motor or other suitable driving means, the motor being mounted to provide an upwardly directed output shaft. A generally cylindrical bowl is supported upon the upper portion of the base, the bowl being centrally apertured in order to permit the rotatable shaft and drive couplings to extend through such aperture. The upper annular edge of the bowl extends substantially above the shaft and drive means, and supports thereon an annular cover member provided with detachable fastening means for retaining the cover member and bowl in assembled relation with the base. A perforated basket is mounted upon the upper end of the output shaft, the basket being housed within the bowl. The side walls of the basket extend generally upwardly and outwardly from the connection with the output shaft; the side walls of the basket as seen in section are desirably substantially parabolic in contour. Above the bottom of the basket there is provided a shredder head assembly including a downwardly projecting stud adapted to be connected with the output shaft and a shredder plate having a generally conical upper face, the face being provided with a plurality of cutting blades adapted to macerate or shred food material such as fruits and vegetables pressed down upon the upper face.

Feed tube means are provided for guiding incoming fruits and vegetables into contact with the shredder head. In accordance with the present invention such feed tube means include a member having an outwardly extending rim adapted to rest upon the cover member previously referred to, and having a substantially cylindrical downwardly extending sleeve terminating in an annular lower edge concentric with and spaced slightly above the outer edge of the shredder plate. Operation of the present device contemplates that incoming food material to be shredded may contact virtually the entire upper face of the shredder plate. To facilitate such operation, the feed tube is provided with a vertically disposed upstanding central partition which effectively divides the shredding area into two substantially semi-circular portions. Thus the partition serves as an abutment against which the food materials being shredded may be pressed by the rotation of the shredder plate, and both of the semi-circular spaces immediately above the shredder are available for use during the shredding operation.

In accordance with the invention the preferred construction of the shredder plate includes a plurality of cutting elements for blades arranged in a number of straight rows. The rows may be radial relative to the shredder plate, or may be arranged to be tangential to a small circle concentric with the shredder plate. The individual cutting elements or blades on the shredder plate are spaced apart along the linear arrangement above referred to, and successive rows of blades are so arranged that their blades are in staggered relation relative to an arc of a circle concentric with the shredder plate. In the preferred form of the shredder plate the lower included apex angle of the conical configuration is not greater than about 160 degrees. Thus the shredder plate is a fairly shallow cone in the configuration of its upper surface. As an alternative construction, the shredder plate may be made to be considerably steeper, with an included apex angle of about 90 degrees. Moreover, the shredder plate may be provided with a number of openings therethrough immediately forwardly of each of the cutting elements of the plate. In this construction there is also provided beneath the shredder plate a circular slinger member fixed to the lower portion of the perforated basket, so that food material, juice and pulp shredded by the shredder plate falls through the openings of the shredder plate onto the slinger member and, by centrifugal force, is thrown outwardly from the slinger member to the bottom portion of the perforated basket.

Accordingly it is a principal object of the present invention to disclose a novel construction of a power operated juice extracting device.

Another object of this invention is to disclose such a device provided with a shredder plate having a plurality of cutting elements on the upper surface thereof, the cutting elements being arranged in straight rows and spaced therealong, cutting elements of successive rows being radially staggered relative to one another.

A further object of the invention is to disclose a power operated juice extractor in which virtually the entire shredding surface of the shredder plate may be used in operation.

A further object of the invention is to provide, in a device of the class described, a rotatable perforated basket having side walls of substantially parabolic configuration as seen in section extending upwardly and outwardly from the outer edge of the shredder plate.

Other objects and purposes of the invention will become clear from a study of the following description of preferred embodiments thereof taken in connection with the accompanying drawings in which:

FIGURE 2 is a vertical sectional view of the upper portion of the device with the retaining clamps opened and the feed tube removed.

FIGURE 3 is a plan view on an enlarged scale of a preferred form of the shredder plate taken in the direction of the arrows III—III of FIG. 2.

FIGURE 4 is a sectional view on an enlarged scale taken along the line IV—IV of FIG. 3.

FIGURE 5 is a plan view similar to FIG. 3 but showing a modified form of arrangement of the cutting blades on the shredder plate.

FIGURE 6 is a sectional view similar to FIG. 2 except employing a modified form of shredder plate.

Figures 1, 11:
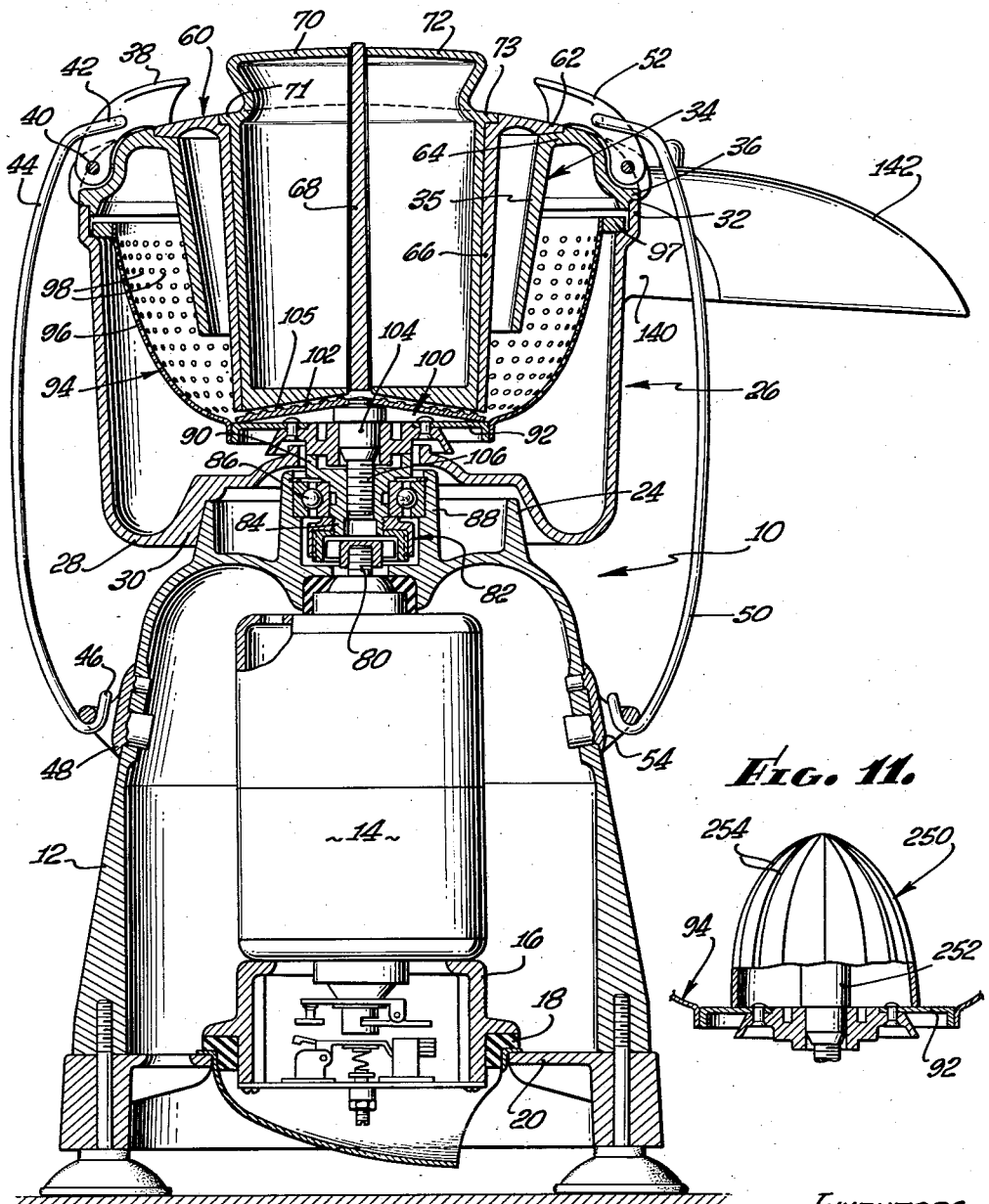
FIGURE 1 is a vertical sectional view of a power operated juice extractor in accordance with the present invention.
FIGURE 11 is a side elevational view of a citrus reamer as mounted for rotation in the upper portion of the device of the present invention, together with a fragmentary showing of the lower portion of the basket.

Referring now in detail to the drawings, in FIG. 1 there is indicated generally at 10 a juice extractor in accordance with the present invention. The extractor includes an upstanding base indicated generally at 12 having a hollow interior in which is mounted a driving motor 14 provided with a support bracket 16 resting upon a resilient, annular shock mount 18 which in turn is supported upon an internal shoulder 20 of the base. The lower bracket 16 may be provided in its interior with speed-control governor means of conventional design in order to maintain the motor speed at from about 4000 r.p.m. to about 5000 r.p.m. during operation. Base 12 includes at its upper end an upstanding, annular rim 24 on which is mounted a juice bowl indicated generally at 26. The bowl is desirably made of strong, easily cleaned material such as glass, suitable plastic such as styrene, or the like. The bowl in its lower portion includes a peripheral trough 28 for collecting therein the fruit or vegetable juice extracted by the present device and spacer elements as indicated at 30 are desirably formed integrally with the bowl inwardly of trough 28 to slidably contact the upper rim 24 of the base for centering the bowl when mounted upon the base as shown.

In the upper portion of the bowl 26 there is provided an outwardly offset, annular rim 32 and a cover member indicated generally at 34 includes an outwardly extending flange portion 36 which rests upon the upper circular edge of the bowl. Means are provided for selectively retaining the cover 34 in its assembled position seen in FIG. 1, and in the present illustrative embodiment such means include a toggle member 38 pivotally attached to the cover 34 for rotation about the axis 40 and having pivotally connected thereto one end 42 of an elongated, vertically disposed, clamping member 44, the lower end of the member 44 being hooked or otherwise attached at 46 to a suitably formed bracket 48 attached to the side wall of base 12. A second clamping means identical to the one just described is provided diametrically opposite and includes elongated member 50 extending between the upper clamp 52 and base bracket 54.

A feed tube indicated generally at 60 includes an outwardly extending, upper, flanged rim 62 adapted to rest upon shoulder 64 of cover 34, and a downwardly extending sleeve having generally cylindrical side walls 66. The feed tube 60 is effectively divided into two virtually semicircular portions by a vertically extending partition 68 desirably integrally formed with the rim 62 and sleeve 66. In order to insure that food material is pressed downwardly within feed tube 60 during operation, there may be provided a pair of plug or pusher elements 70 and 72, each adapted to be slidably received within one or the other of the semi-circular portions of the feed tube 60.

The motor 14 includes a vertically oriented output drive shaft 80 connected through flexible coupling means indicated generally at 82 to an internally threaded sleeve 84 rotatably supported by antifriction bearing means 86 mounted in the upper collar 88 of base 12. Upwardly of sleeve 84 and desirably formed integrally therewith is an upwardly open, cup-like portion 90 which in turn supports a rotatable base member 92. A basket indicated generally at 94 is provided with side walls 96 fixed at their lower ends to the outer rim of base 92, the side walls extending curvilinearly outwardly and upwardly from the base, within the bowl 26. The side wall 96 of the basket is perforated with a multiplicity of small openings therethrough 98 having diameters of not more than about 0.025 inch.

The shredder plate assembly is indicated generally at 100 and includes an upper shredder head 102 and fixed thereto a downwardly extending rod 104 having a lower threaded portion 106 adapted to be threadedly received in the bore of sleeve 84. The upper surface of the shredder head 102 is provided with a plurality of small cutting blades as is best seen in FIG. 3.

The arrangement of cutting blades on shredder 102 is seen in FIGS. 3 and 4. The blades 105 are arranged in a number of straight rows and in the form seen in FIG. 3 such rows extend radially of the plate. The blades are desirably formed by deforming portions of the plate upwardly. As seen in FIG. 4, the deformed portion 108 projects above the body 102, and the uppermost part is ground off to form the cutting blade 105. The blades are spaced along their rows by intervals substantially equal to the width of each blade itself, and the teeth in successive rows are staggered radially of the shredder so that a tooth of one row is arcuately aligned with the interval between teeth on the preceding and succeeding rows. Thus in FIG. 3 the arcuate construction lines 110 and 112 include between them a tooth of row A, an interval between teeth in row B, and a tooth of row C. The upper surface of shredder 102 is desirably conical as seen in FIGS. 1 and 2, the lower included apex angle being not more than about 160 degrees.

In FIG. 5 there is shown an alternative form of shredder plate wherein the blades are arranged in rows which are disposed tangentially of a small circle concentric with the shredder plate. In all forms of the shredder there is an even number of rows of teeth.

Figure 7:
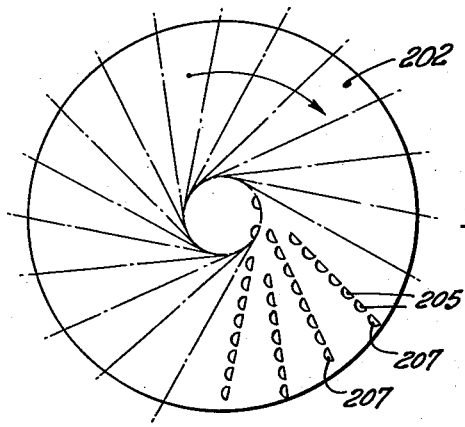
FIGURE 7 is a plan view on an enlarged scale of the shredder plate of FIG. 6 as seen substantially along the arrows VII—VII of FIG. 6.
Figure 8:
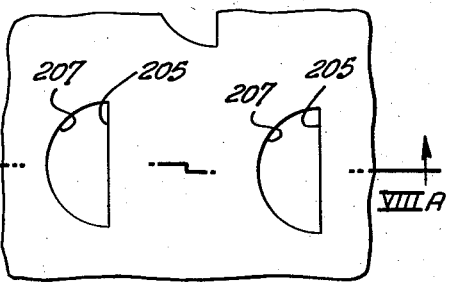
FIGURE 8 is a fragmentary sectional view on an enlarged scale taken along line VIII—VIII of FIG. 7.
Figure 8A:
FIGURE 8A is a sectional view taken along line VIIIA—VIIIA of FIG. 8.

Construction according to the present invention embodying a modified form of shredder plate is shown in FIG. 6. Here the shredder head indicated generally at 200 includes a shredder plate 202 whose upper surface is more steeply conical than in the case of shredder plate 102. The shredder 202 may have a lower included apex angle of between about 70 degrees and 110 degrees, so that substantially more shredding surface is available, thus expediting the shredding operation. As best seen in FIGS. 7 and 8, the shredder 202 includes a number of cutting blades 205 arranged in straight lines on the upper surface of the shredder, the lines being here shown illustrately as tangential to a small circle concentric with the shredder. Immediately in front of each of the cutting blades 205 there is provided an opening 207 through the plate, whereby juice and pulp from the food material being shredded may pass through the shredder plate downwardly. The downwardly projecting stud 204 fixed to the lower surface of the shredder 202 passes through a central aperture 220 of a circular slinger member 222 mounted upon the supporting base 192. Thus the pulp and juice falling downwardly through the openings 207 of the shredder 202 fall upon the slinger member 222 and, by reason of the rapid rotation of the slinger, are thrown centrifugally outwardly into the lower portion of the basket 94. It will be seen that the feed tube indicated generally at 160 used in this form of the invention is similar in major respects to feed tube 60 heretofore described in connection with FIG. 1, except that the central partition 168 of feed tube 160 is substantially shorter than the partition 68. In each case the central partition terminates downwardly immediately above the apex of the conical shredder plate.

Figure 10:
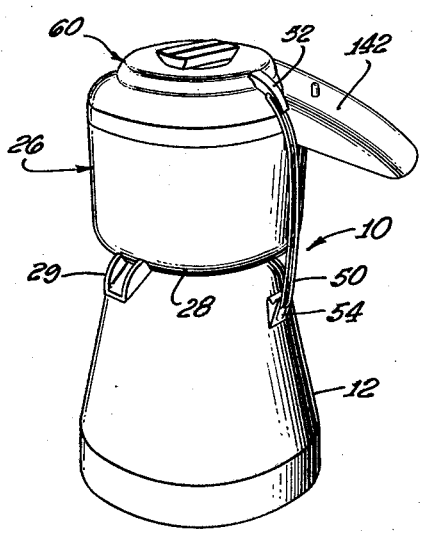
FIGURE 10 is a perspective view on a small scale of the juice extractor of the present invention.
Figure 9:
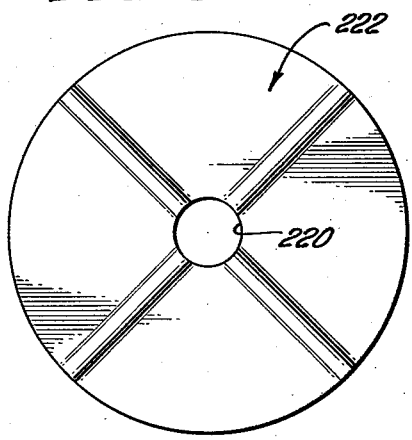
FIGURE 9 is a fragmentary view on an enlarged scale of the bottom portion of the perforated basket and the slinger member connected thereto taken along the arrows IX—IX of FIG. 6.

In operation in the case of any of the several forms of the invention, food material is inserted downwardly in one or both of the semi-circular portions of the feed tube formed by the central partition. The shredder plate is rotated in a clockwise direction as seen in FIGS. 3, 5, and 7 so that small portions of the food material resting thereon are shredded or macerated. This operation releases a certain amount of the juice of the food material, but additional juice remains in the pulp. Since the juice and pulp are thrown centrifugally into the lower portion of the basket 94, the juice passes through the perforations 98 of the basket and is collected in the trough 28 of the bowl 26 and may be dispensed from the outlet 29 by reason of the curvilinear, preferably substantially parabolic contour of the side wall of the basket. The moist pulp, still retaining a substantial amount of juice, is forced upwardly and radially outwardly along the inner surface of the basket. Passage of the pulp over the many perforations through the side wall of the basket causes additional juice to be released from the pulp and pass through the perforations, falling into the trough 28 of the bowl. The force causing extraction of the juice from the pulp in this manner steadily increases as the linear speed of the pulp increases by reason of the increasing radius, so that pulp in the upper portion of the basket has had removed therefrom virtually all of its juice. The virtually dried pulp is then forced outwardly over the upper rim 97 of the basket and is permitted to escape from the rim 32 of the bowl where that rim is interrupted to form the discharge opening 140 leading outwardly to the discharge shield 142. The pulp coming out of the outlet 140, being directed downwardly by the shield 142, may be received in a suitable container, such as a flexible sack or the like, for disposal. It will be seen in FIG. 10 that the pulp outlet shield 142 is eccentric relative to the extractor, being generally tangential in order to most effectively receive the dry pulp fed thereto as heretofore described. The feed plugs or pushers 70 and 72 in the form of the invention of FIG. 1 and the corresponding parts 170 and 172 in the form of the invention in FIG. 6 may be made of any suitable light weight material, such as wood, plastic, or the like, and used for urging downwardly in the feed tube food material such as lettuce leaves or the like which will not easily fall downwardly in the feed tube by gravity. Each of the pushers is provided with an outwardly extending upper rim 71, 73, 171, and 173 to serve as a limiting means preventing the lower portion of the pusher from actually contacting the shredder. Although the preferred form of the invention includes a feed tube having a single diametrical partition therein providing a pair of semi-circular channels, nevertheless the feed tube could include additional vertical partition or abutment members if desired so that three, four or more channels are provided.

A particular advantage of the present construction is illustrated in FIG. 11 where a citrus reamer indicated generally at 250 includes a downwardly projecting stud or rod 252 corresponding to rod 104 previously referred to in connection with FIG. 1. The reamer is mounted to rest directly upon base member 92, and includes conventional arcuate flutings or ridges 254 by which to effectively ream out the pulp and juice of an orange or the like cut in half. When the present device is so used, the feed tube 60 is wholly removed, as shown in FIG. 2, to afford sufficient space for the hand of the user to be inserted into the upper portion of the machine, grasping the fruit to be reamed. Under these conditions it is to be noted that the lower depending wall or sleeve 35 of cover 34 prevents any possibility that the user's hand might contact the rapidly rotating basket 94. It is to be noted that removal of the shredding plate or head and substitution of reamer 250 is quickly accomplished by unscrewing the stud or rod 104 from the threaded bore of sleeve 84. This construction likewise permits use of other food treatment members such as macerating, shredding, or grinding devices if desired.

In the form of the invention herein shown clockwise rotation of the vertical motor shaft is assumed and the bore of sleeve 84 is provided with right hand threads. It is of course obvious that counterclockwise rotation of the motor shaft could also be used, with corresponding reversal of the hand of the threaded connection of sleeve 84 and also repositioning of the pulp outlet 140.

The shredder heads or plates of the present invention may be made of suitably hardened metal throughout, or alternative constructions may be employed such as metal teeth inserted into a molded plastic shredder body or other suitable arrangement of component parts.

The bowl, feed tube, cover, and other major structural elements of the present invention may be made of any smooth surfaced, substantially rigid material affording adequate strength and permitting easy cleaning.

Although certain modifications and changes from the preferred embodiment of the invention have been described and illustrated herein, it is to be understood that other variations from the specific illustrated forms of the invention may be made without departing from the scope of the appended claims.

What is claimed is:
1. In a juice extractor, in combination: a base, an open topped bowl mounted on the base and provided with a centrally apertured bottom; a removable comminuting element rotatably mounted on the base above the bottom of the bowl and concentric therewith; a strainer basket rotatably mounted on the base and provided with a perforated side wall extending curvilinearly upwardly and outwardly from a location adjacent the comminuting element periphery; an annular cover member removably supported on the upper part of the bowl and provided with a downwardly extending sleeve spaced inwardly of the perforated side wall; a feed tube removably supported on the upper part of the cover and provided with a downwardly extending generally cylindrical side wall spaced inwardly from said sleeve and terminating immediately above said comminuting element and concentric therewith, the tube having vertically disposed partition means dividing the interior into separated food supply channels; manually actuable toggle means for removably retaining the cover and, selectively, the feed tube in fixed assembled relation with the base; and means for rotating the comminuting element and basket.

2. In a juice extractor as defined in claim 1 wherein the comminuting element comprises a shredder plate.

3. In a juice extractor as defined in claim 1 wherein the comminuting element comprises a citrus reamer and the feed tube is removed while the reamer is in use.

4. In a juice extractor, in combination: a base; an open topped bowl mounted on the base and provided with a centrally apertured bottom; a shredder plate rotatably mounted on the base above the bottom of the bowl and concentric therewith; a strainer basket rotatably mounted on the base and provided with a perforated side wall extending curvilinearly unwardly and outwardly from the shredder plate periphery; an annular cover member removably supported on the upper part of the bowl and provided with a downwardly extending sleeve spaced inwardly of the perforated side wall; a feed tube removably supported on the upper part of the cover and provided with a downwardly extending generally cylindrical side wall spaced inwardly from said sleeve and terminating immediately above said shredder plate and concentric therewith, the tube having vertically disposed partition means dividing the interior into separated food supply channels; manually actuable toggle means for removably retaining the cover and, selectively, the feed tube in fixed assembled relation with the base; and means for rotating the shredder plate and basket.

References Cited in the file of this patent

UNITED STATES PATENTS

| | | |
|---|---|---|
| 2,840,130 | Schwarz | June 24, 1958 |
| 2,844,176 | Barrows et al. | July 22, 1958 |

FOREIGN PATENTS

| | | |
|---|---|---|
| 236,206 | Switzerland | May 16, 1945 |
| 742,343 | Great Britain | Dec. 21, 1955 |